(12) United States Patent
Jo

(10) Patent No.: US 11,279,620 B2
(45) Date of Patent: Mar. 22, 2022

(54) CARBON MATERIAL COATED WITH TANTALUM CARBIDE

(71) Applicant: Tokai Carbon Korea Co., LTD, Gyeonggi-do (KR)

(72) Inventor: Dong Won Jo, Anseong-si (KR)

(73) Assignee: Tokai Carbon Korea Co., LTD, Anseong-Si (KR)

( * ) Notice: Subject to any disclaimer, the term of this patent is extended or adjusted under 35 U.S.C. 154(b) by 36 days.

(21) Appl. No.: 16/098,568

(22) PCT Filed: May 24, 2017

(86) PCT No.: PCT/KR2017/005358
§ 371 (c)(1),
(2) Date: Nov. 2, 2018

(87) PCT Pub. No.: WO2017/204534
PCT Pub. Date: Nov. 30, 2017

(65) Prior Publication Data
US 2020/0216319 A1    Jul. 9, 2020

(30) Foreign Application Priority Data
May 25, 2016 (KR) .................. 10-2016-0064255

(51) Int. Cl.
*C01B 32/05* (2017.01)
*C01B 32/914* (2017.01)

(52) U.S. Cl.
CPC ............ *C01B 32/05* (2017.08); *C01B 32/914* (2017.08); *C01P 2002/72* (2013.01)

(58) Field of Classification Search
CPC .............................. C01B 32/05; C01B 32/914
(Continued)

(56) References Cited

U.S. PATENT DOCUMENTS

2013/0061800 A1* 3/2013 Nakamura ............ C30B 35/002
117/84

FOREIGN PATENT DOCUMENTS

| CN | 1730436 | 2/2006 |
| CN | 102295474 | 12/2011 |

(Continued)

OTHER PUBLICATIONS

Tadashi et al., JP 3938361 B2 machine translation, Jun. 27, 2007, entire translation (Year: 2007).*

(Continued)

*Primary Examiner* — Humera N. Sheikh
*Assistant Examiner* — Katherine A Christy
(74) *Attorney, Agent, or Firm* — Evan Law Group LLC

(57) ABSTRACT

The present invention relates to a carbon material coated with tantalum carbide and, more specifically, to a carbon material coated with tantalum carbide, comprising: a carbon substrate; and a tantalum carbide coated surface formed on the carbon substrate, wherein the carbon material coated with tantalum carbide has, as main peaks, X-ray diffraction peaks of the (111) plane, the (200) plane, the (220) plane and the (311) plane, of the tantalum carbide coated surface, and the peak of the (111) plane among the peaks has the maximum diffraction intensity. The present invention can provide the carbon material coated with tantalum carbide, having excellent chemical and physical resistance and extended lifespan.

11 Claims, 3 Drawing Sheets

(58) Field of Classification Search
USPC .......................................................... 428/408
See application file for complete search history.

(56) References Cited

FOREIGN PATENT DOCUMENTS

| | | | | |
|---|---|---|---|---|
| CN | 103922797 | | 7/2014 | |
| CN | 201780023205.3 | | 6/2021 | |
| EP | 1 852 407 | | 11/2007 | |
| EP | 17803053.2 | | 12/2019 | |
| JP | 2004-084057 | | 3/2004 | |
| JP | 2004084057 | | 3/2004 | |
| JP | 3938361 | B2 * | 6/2007 | ......... C04B 35/5607 |
| JP | 2013-75814 | | 4/2013 | |
| JP | 2018-555583 | | 10/2019 | |
| KR | 20070020225 | | 2/2007 | |
| KR | 20110024381 | | 3/2011 | |
| KR | 20120104260 | | 9/2012 | |
| KR | 20150114942 | | 10/2015 | |
| KR | 101591050 | | 2/2016 | |

OTHER PUBLICATIONS

Extended European Search Report dated Dec. 20, 2019 for European application No. 17803053.2, 8 pages.
Nakamura, D., et al., "Sintered tantalum carbide coatings on graphite substrates: Highly reliable protective coatings for bulk and epitaxial growth", Applied Physics Letters, vol. 106, pp. 082108-1-082108-5, (2015).
Ali, M. et al., "Tantalum carbide films synthesized by hot-filament chemical vapor deposition technique", Surface & Coatings Technology, vol. 206, pp. 2833-2838, (2012).
Xiong, X. et al., "Surface morphology and preferential orientation growth of TaC crystals formed by chemical vapor deposition", Thin Solid Films, vol. 517, pp. 3235-3239, (2009).

\* cited by examiner

CARBON MATERIAL COATED WITH TANTALUM CARBIDE

TECHNICAL FIELD

The following description relates to a carbon material coated with tantalum carbide.

BACKGROUND ART

Generally, when a carbon material used in an existing semiconductor process is used for a susceptor, a focus ring, an electrode, and the like, used in light emitting diode (LED) manufacturing equipment, a foreign substance is generated in the carbon material.

Considering such an issue, a method of coating a surface of a structure of a carbon material with SiC or TaC has been used.

For example, a technology for coating a parent material, such as the carbon material, and the like, with TaC or SiC is disclosed in Korean Patent No. 10-1100041 (granted on Dec. 22, 2011, Manufacturing method of susceptor for an LED manufacturing device).

There is a high likelihood of SiC being used due to its strong chemical resistance and high physical strength. However, to manufacture SiC, a high temperature, such as 1800° C. or higher, is required and hydrogen, $NH_3$, hydrocarbon gas, and the like, are used as a carrier gas or a raw material gas, and thus $Si_2N_4$ is generated by a reaction of ammonia. Also, SiC on a carbon parent material may be corroded and cracked, or exfoliated by a gasification reaction at a high temperature, such as 1500° C. or higher. Due to such an issue, a coating using a TaC film that is excellent in heat resistance and corrosion resistance is preferred.

To obtain a TaC coating film, an AIP method and a CVD method are used. The CVD method is mainly used to obtain a TaC coating film that is dense and has a developed crystallinity. When the CVD method is used, a TaC crystal has only a characteristic of a specific growing plane since the crystal is grown in a specific direction. Thus, a flexibility decreases, and a carbon parent material is rapidly corroded by ammonia, hydrogen gas, and the like when the TaC coating film is cracked or exfoliated due to a thermal shock, and the like.

To overcome such an issue, proposed is a method of forming a dense film using a method of forming a TaC coating film with a non-crystallinity or a low crystallinity based on the CVD method. Although the flexibility may be enhanced in comparison to that of an existing method, the crystallinity changes in response to an exposure to a high temperature for a long period of time. Thus, the TaC coating film is cracked or exfoliated due to a thermal shock, a reducing gas, and the like, and a life span of the TaC coating film decreases.

DISCLOSURE OF INVENTION

Technical Subject

Example embodiments provide a carbon material coated with tantalum carbide that may form a tantalum carbide film that is resistant to a shock and a corrosion by physical and chemical factors and that has an extended life span.

Subjects to be solved by the present disclosure are not limited to those described above, and any other subjects not mentioned so far will be clearly appreciated by those skilled in the art from the following description.

Technical Solutions

According to an aspect, there is provided a carbon material coated with tantalum carbide including a carbon substrate and a tantalum carbide coated surface formed on the carbon substrate. The carbon material coated with tantalum carbide has X-ray diffraction peaks of a (111) plane, a (200) plane, a (220) plane, and a (311) plane of the tantalum carbide coated surface, and the X-ray diffraction peak of the (111) plane among the X-ray diffraction peaks has a maximum diffraction intensity.

According to an example embodiment, a ratio of a diffraction intensity of any one X-ray diffraction peak among the X-ray diffraction peaks of the (200) plane, the (220) plane, and the (311) plane/a diffraction intensity of the X-ray diffraction peak of the (111) plane may range from 0.6 to 0.9.

According to an example embodiment, a ratio of a diffraction intensity of the X-ray diffraction peak of the (220) plane or the (311) plane/a diffraction intensity of the X-ray diffraction peak of the (200) plane may range from 0.6 to 1.

According to an example embodiment, a ratio of a peak area of one of the X-ray diffraction peaks of the (200) plane, the (220) plane, and the (311) plane/an X-ray diffraction peak area of the (111) plane may range from 0.6 to 0.9.

According to an example embodiment, a ratio of an X-ray diffraction peak area of the (220) plane or the (311) plane/an X-ray diffraction peak area of the (200) plane may range from 0.6 to 1.

According to an example embodiment, a value of 2θ of the X-ray diffraction peak of the (111) plane may range from 34° to 35°.

Effect of the Invention

According to example embodiments, it is possible to provide a carbon material coated with tantalum carbide that may flexibly reduce a stress caused by a temperature change, such as a high temperature, cooling, and the like, that may have an excellent corrosion resistance to a reducing gas atmosphere, and the like, and that may be physically and chemically strong, due to a combination of crystal planes grown in various directions.

According to example embodiments, it is possible to provide a carbon material coated with tantalum carbide that may have an extended life span since a tantalum carbide coated surface is less easily cracked and exfoliated.

According to example embodiments, it is possible to provide a carbon material coated with tantalum carbide that may be excellent in a chemical resistance to a corrosive gas with a high temperature, and the like, and that may be effectively applied as a protection material for a high temperature epi process.

BEST MODE FOR CARRYING OUT THE INVENTION

Hereinafter, example embodiments of the present disclosure will be described in detail. In the description of example embodiments, detailed description of well-known related functions or configurations will be omitted when it is deemed that such description will cause ambiguous interpretation of the present disclosure. Also, terminologies used herein are defined to appropriately describe the example embodiments of the present disclosure and thus may be changed depending on a user, the intent of an operator, or a custom of a field to which the present disclosure pertains. Accordingly, the terminologies must be defined based on the following overall description of this specification.

The present disclosure relates to a carbon material coated with tantalum carbide (hereinafter, referred to as a tantalum carbide-coated carbon material). According to an example embodiment, the tantalum carbide-coated carbon material may include a tantalum carbide film that has a good compactness and that includes a tantalum carbide crystal with a high anisotropy. Thus, the tantalum carbide-coated carbon material may be resistant to chemical and physical damage factors, such as a thermal shock, a corrosion by a reducing gas, and the like, thereby extending a life span of the tantalum carbide-coated carbon material.

Figure 1:
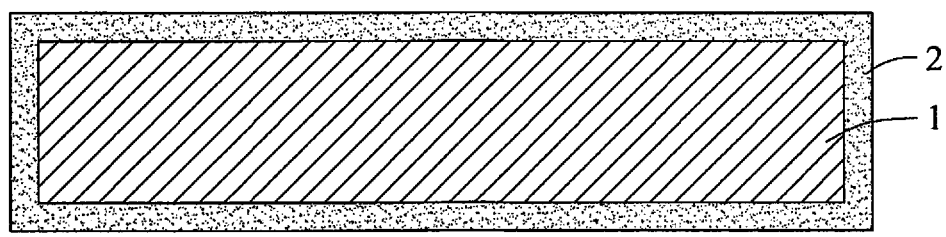
FIG. 1 illustrates an example of a cross section of a carbon material coated with tantalum carbide according to an example embodiment.

FIG. 1 illustrates an example of a cross section of a tantalum carbide-coated carbon material according to an example embodiment. According to an example embodiment, referring to FIG. 1, the tantalum carbide-coated carbon material of the FIG. 1 may include a carbon substrate 1, and a tantalum carbide coated surface 2 formed on the carbon substrate 1.

For example, the carbon substrate 1 may include a material formed of carbon applied in a semiconductor process, and the like. The material may include, for example, graphite, isotropic graphite, graphite, a carbon fiber reinforced carbon composite, desirably, graphite.

For example, crystal planes may be grown in various directions, and characteristics of the crystal planes based on a growing direction may be properly combined, and thus the tantalum carbide coated surface 2 may flexibly reduce a stress due to an external factor, and may include crystalline tantalum carbide that has a high anisotropy and that is resistant to a surface damage, a corrosion, and the like, due to a chemical factor, such as a reducing gas, and the like.

For example, the tantalum carbide coated surface 2 may be formed using a CVD method and may be formed by applying a Ta source gas supplied from halogenated Ta, a C source gas, and a common carrier gas, such as hydrogen, nitrogen, helium, argon, and the like.

Figure 2:
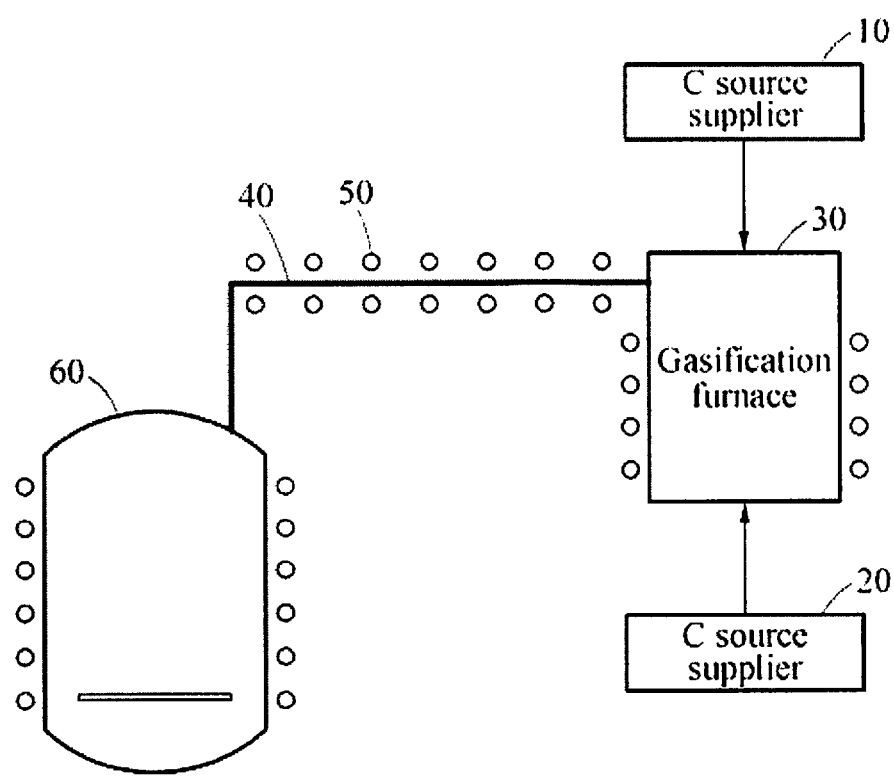
FIG. 2 illustrates an example of a configuration of a tantalum carbide deposition apparatus according to an example embodiment.

The CVD method may be performed under a process condition applied in a technical field of the present disclosure. For example, the tantalum carbide coated surface 2 may be prepared using a deposition apparatus of FIG. 2. FIG. 2 illustrates an example of a configuration of a tantalum carbide deposition apparatus according to an example embodiment. Referring to FIG. 2, the tantalum carbide deposition apparatus may include a gasification furnace 30 configured to provide a Ta source by heating and gasifying halogenated Ta supplied though a Ta supplier 10; a C source supplier 20 configured to supply a C source to the gasification furnace 30 and uniformly mix the Ta source and the C source; a supply pipe 40 configured to deposit the Ta source and the C source the at are uniformly mixed in the gasification furnace 30, to a deposition furnace 60; a heater 50 configured to heat the supply pipe 40 and prevent a solidification of the Ta source; and the deposition furnace 60 configured to form a tantalum carbide film by depositing the Ta source and the C source that are mixed in the gasification furnace 30 and that are supplied through the supply pipe 40, on the carbon substrate 1.

For example, the C source may be supplied to the gasification furnace 30 after the gasifying of the halogenated Ta, or the C source may be supplied thereto prior to the gasifying of the halogenated Ta.

For example, the heater 50 may maintain the supply pipe 40 at a temperature of 100° C. or higher, desirably, at a temperature of 100° C. to 500° C., to prevent the solidification of the Ta source flowing through the supply pipe 40.

For example, the deposition furnace 6 may maintain a pressure of 1.33 Pa to 13.3 Pa and deposit the tantalum carbide coated surface 2 on the carbon substrate 1 using the CVD method at a temperature of 750° C. to 2500° C.; and desirably at a temperature of 800° C. to 2300° C. Also, after the depositing, a heat treatment may be performed in a gas atmosphere, such as hydrogen, argon, helium, and the like, at a temperature of 1500° C. to 2700° C.; and desirably, at a temperature of 1500° C. to 2500° C., for 10 hours to 24 hours. Through a heat treatment after the deposition, it is possible to achieve an effect of relieving stress of a coating film and controlling a resistance, and the like.

For example, the tantalum carbide coated surface 2 may include 40 wt % to 60 wt % of Ta and 40 wt % to 60 wt % of C.

For example, the tantalum carbide coated surface 2 may be formed with a thickness of 5 μm to 50 μm; and desirably, a thickness of 10 μm to 30 μm. When the thickness is within the above range, a dense and uniform film may be formed and a tantalum carbide crystal with a high anisotropy and crystallinity may be formed. Also, a tantalum carbide-coated carbon material that may be used at a high temperature and in a reducing gas atmosphere for a long period of time may be provided.

Figure 3:
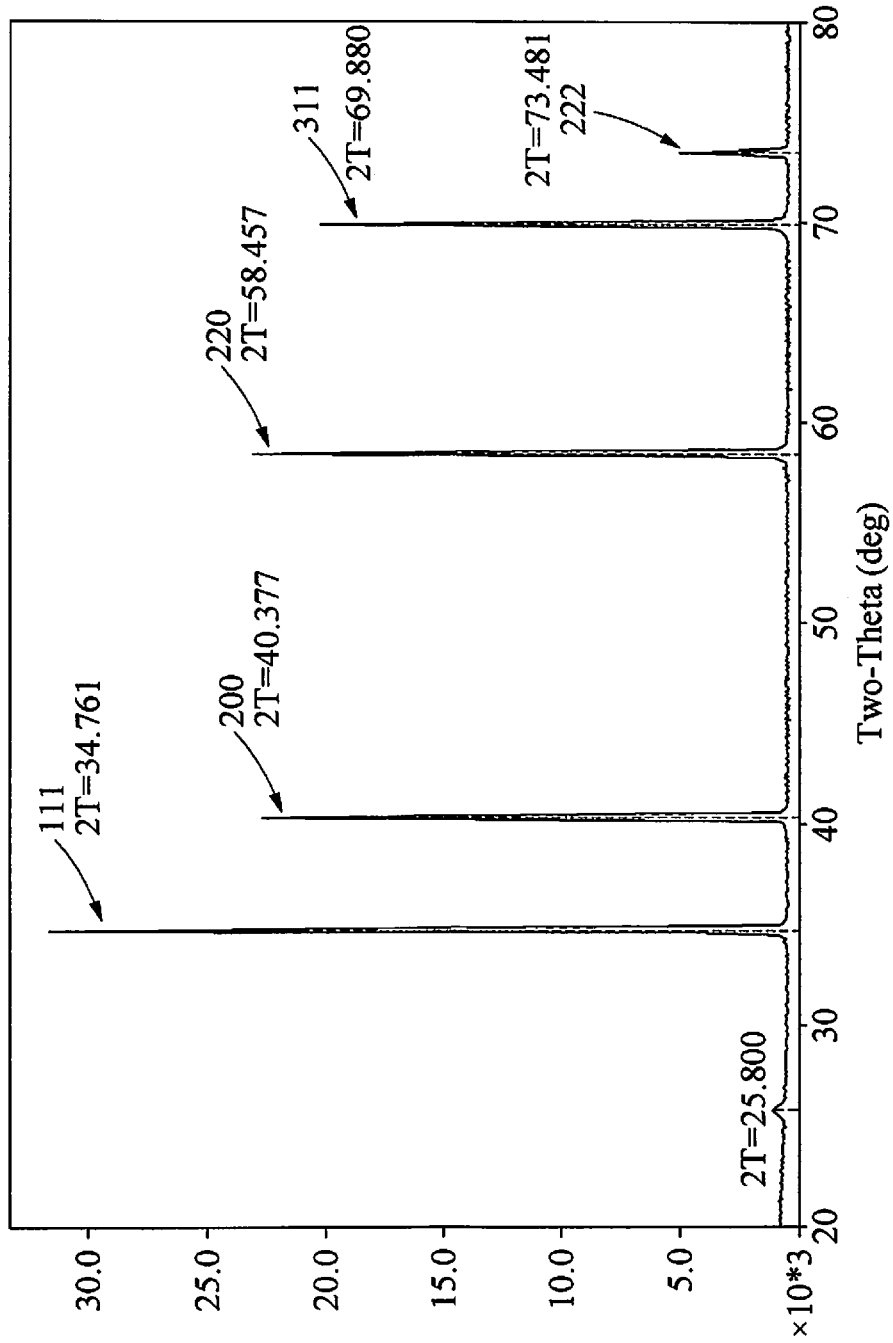
FIG. 3 is a graph showing an X-ray diffraction pattern of a carbon material coated with tantalum carbide according to an example embodiment.

For example, the tantalum carbide coated surface 2 may include an anisotropic tantalum carbide crystal having a high crystallinity and various crystal planes that are grown. The above crystal planes will be described with reference to FIG. 3. FIG. 3 is a graph showing an X-ray diffraction pattern of a tantalum carbide-coated carbon material with respect to a tantalum carbide coated surface according to an example embodiment.

Referring to FIG. 3, the X-ray diffraction pattern may be measured using an X-ray diffraction measurement method applied in a technical field of the present disclosure. F or example, a thin film or powder X-ray diffraction measurement method may be used, although is not described in detail herein. Desirably, the measurement may be performed by irradiating an X-ray on a tantalum carbide surface of the tantalum carbide-coated carbon material. The X-ray diffraction pattern was obtained using a "Rigaku, Dmax 2500" as an X-ray analyzer and shown in the graph of which a vertical axis represents a diffraction intensity and a horizontal axis represents a diffraction angle 2θ. The tantalum carbide was verified by MDI/JADE 35-0801. Also, an intensity, a full width at half maximum, and an area ratio of a diffraction peak were calculated using the X-ray pattern.

For example, in the X-ray diffraction pattern of FIG. 3, the tantalum carbide coated surface may have diffraction peaks observed when a value of 2θ ranges from 20° to 80°. Desirably, the X-ray pattern may include X-ray diffraction peaks of a (111) plane, a (200) plane, a (220) plane, and a (311) plane as main peaks, which may indicate that crystal planes of the tantalum carbide are grown in various directions. Due to the crystal planes being grown in various directions, a flexibility of the tantalum carbide may increase in comparison to that of existing tantalum carbide that is mainly grown in a predetermined direction only. Since characteristics of various crystal planes are properly combined, the tantalum carbide coated surface vulnerable to physical and chemical damage factors may be complemented. Also, the tantalum carbide coated surface may be less damaged and exfoliated due to a thermal shock, a cooling, a reducing gas, and the like, and a life span may be extended.

For example, among the X-ray diffraction peaks, the peak of the (111) plane may have a full width at half maximum of 0.1° to 0.5°, the peak of the (200) plane may have a full width at half maximum of 0.1° to 0.5°, the peak of the (220) plane may have a full width at half maximum of 0.1° to 0.5°, and the peak of the (311) plane may have a full width at half maximum 0.1° to 0.5°, which may indicate that growing planes in directions of the (111) plane, the (200) plane, the (220) plane, and the (311) plane are grown with a high crystallinity. Due to the high crystallinity, all characteristics of each of the growing planes may be exhibited.

For example, a value of 2θ of the peak of the (111) plane among the X-ray diffraction peaks may range from 34° to 35°; desirably, 34.2° to 34.8°; more desirably, 34.6° to 34.8°. The peak of the (111) plane may indicate a maximum diffraction intensity.

For example, a ratio of a diffraction intensity of any one X-ray diffraction peak among the X-ray diffraction peaks of the (200) plane, the (220) plane, and the (311) plane/a diffraction intensity of the X-ray diffraction peak of the (111) plane may range from 0.6 to 0.9; more desirably, 0.7 to 0.8. When the above diffraction intensity ratio is within the above range, all the characteristics of the growing planes in the directions of the (111) plane, the (200) plane, the (220) plane, and the (311) plane may be exhibited. Since the characteristics are properly combined, a physically and chemically strong material may be provided.

For example, a value of 2θ of the peak of the (220) plane among the X-ray diffraction peaks may range from 38° to 41°; desirably, 39° to 40.5°.

For example, the peak of the (220) plane may have a diffraction intensity that is identical to or higher than that of the peaks of the (220) plane and the (311) plane. Desirably, a ratio of a diffraction intensity of an X-ray diffraction peak of the (220) plane or the (311) plane/a diffraction intensity of the X-ray diffraction peak of the (200) plane may range from 0.6 to 1; desirably, 0.7 to 0.9; more desirably, 0.75 to 0.85.

For example, the peaks of the (111) plane, the (200) plane, the (220) plane, and the (311) plane among the X-ray diffraction peaks may have a high crystallinity, and the peak of the (111) plane among the X-ray diffraction peaks may indicate a maximum crystallinity.

For example, a ratio of a peak area of one of the X-ray diffraction peaks of the (200) plane, the (220) plane, and the (311) plane/an X-ray diffraction peak area of the (111) plane may range from 0.5 to 1; desirably, 0.6 to 0.9. When the X-ray diffraction peak area is within the above range, the characteristics of the growing planes in the directions of the (111) plane, the (200) plane, the (220) plane, and the (311) plane may be properly combined, thereby reducing a stress in various directions. Thus, a characteristic of resistance to a thermal shock may be provided.

For example, the peak of the (200) plane among the X-ray diffraction peaks may have a crystallinity that is identical to or higher than that of the peaks of the (220) plane and the (311) plane. For example, a ratio of an X-ray diffraction peak area of the (220) plane or the (311) plane/an X-ray diffraction peak area of the (200) plane may range from 0.6 to 1.

According to example embodiments, a carbon material on which a tantalum carbide film with an excellent crystallinity is formed and grown in various crystalline directions may be provided. Thus, it is possible to provide a tantalum carbide-coated carbon material that may be physically and chemically strong since characteristics of various crystal planes are properly combined, and that may have an extended life span. Also, the tantalum carbide-coated carbon material may be easily applied in a semiconductor process that requires a corrosive gas at a high temperature, or that needs to be performed for a long period of time.

A number of example embodiments have been described above, however, it is not limited thereto. It should be understood various modifications and changes may be made to these example embodiments without departing from the spirit and scope of the claims, the detailed description, and the drawings.

The invention claimed is:

1. A carbon material coated with tantalum carbide comprising:
   a carbon substrate; and
   a tantalum carbide coated surface formed on the carbon substrate,
   wherein an X-ray diffraction pattern of the tantalum carbide coated surface has, as main peaks, X-ray diffraction peaks of a (111) plane, a (200) plane, a (220) plane, and a (311) plane of the tantalum carbide coated surface,
   the X-ray diffraction peak of the (111) plane among the X-ray diffraction peaks has a maximum diffraction intensity, and
   a ratio of a diffraction intensity of each of the X-ray diffraction peaks of the (200) plane, and the (220) plane/a diffraction intensity of the X-ray diffraction peak of the (111) plane ranges from 0.6 to 0.9.

2. The carbon material coated with tantalum carbide of claim 1, wherein a ratio of a diffraction intensity of the X-ray diffraction peak of the (220) plane or the (311) plane/a diffraction intensity of the X-ray diffraction peak of the (200) plane ranges from 0.6 to 1.

3. The carbon material coated with tantalum carbide of claim 1, wherein a ratio of a peak area of one of the X-ray diffraction peaks of the (200) plane, the (220) plane, and the (311) plane/an X-ray diffraction peak area of the (111) plane ranges from 0.6 to 0.9.

4. The carbon material coated with tantalum carbide of claim 1, wherein a ratio of an X-ray diffraction peak area of the (220) plane or the (311) plane/an X-ray diffraction peak area of the (200) plane ranges from 0.6 to 1.

5. The carbon material coated with tantalum carbide of claim 1, wherein a value of 2θ of the X-ray diffraction peak of the (111) plane ranges from 34° to 35°.

6. The carbon material coated with tantalum carbide of claim 1, wherein a ratio of a diffraction intensity of each X-ray diffraction peak among the X-ray diffraction peaks of the (200) plane, the (220) plane, and the (311) plane/a diffraction intensity of the X-ray diffraction peak of the (111) plane ranges from 0.6 to 0.9.

7. A carbon material coated with tantalum carbide comprising:
   a carbon substrate; and
   a tantalum carbide coated surface formed on the carbon substrate, wherein an X-ray diffraction pattern of the tantalum carbide coated surface has, as main peaks, X-ray diffraction peaks of a (111) plane, a (200) plane, a (220) plane, and a (311) plane of the tantalum carbide coated surface, the X-ray diffraction peak of the (111) plane among the X-ray diffraction peaks has a maximum diffraction intensity, and a ratio of a diffraction intensity of each of the X-ray diffraction peaks of the (200) plane, the (220) plane, and the (311) plane/a diffraction intensity of the X-ray diffraction peak of the (111) plane ranges from 0.7 to 0.9.

8. The carbon material coated with tantalum carbide of claim 7, wherein a ratio of a diffraction intensity of the X-ray diffraction peak of the (220) plane or the (311) plane/a diffraction intensity of the X-ray diffraction peak of the (200) plane ranges from 0.6 to 1.

9. The carbon material coated with tantalum carbide of claim 7, wherein a ratio of a peak area of one of the X-ray diffraction peaks of the (200) plane, the (220) plane, and the (311) plane/an X-ray diffraction peak area of the (111) plane ranges from 0.6 to 0.9.

10. The carbon material coated with tantalum carbide of claim 7, wherein a ratio of an X-ray diffraction peak area of the (220) plane or the (311) plane/an X-ray diffraction peak area of the (200) plane ranges from 0.6 to 1.

11. The carbon material coated with tantalum carbide of claim 7, wherein a value of $2\theta$ of the X-ray diffraction peak of the (111) plane ranges from 34° to 35°.

* * * * *